May 10, 1966  F. SINGER  3,250,201
DIAPHRAGM FOR PHOTOGRAPHIC AND OTHER PURPOSES
Filed Aug. 19, 1963
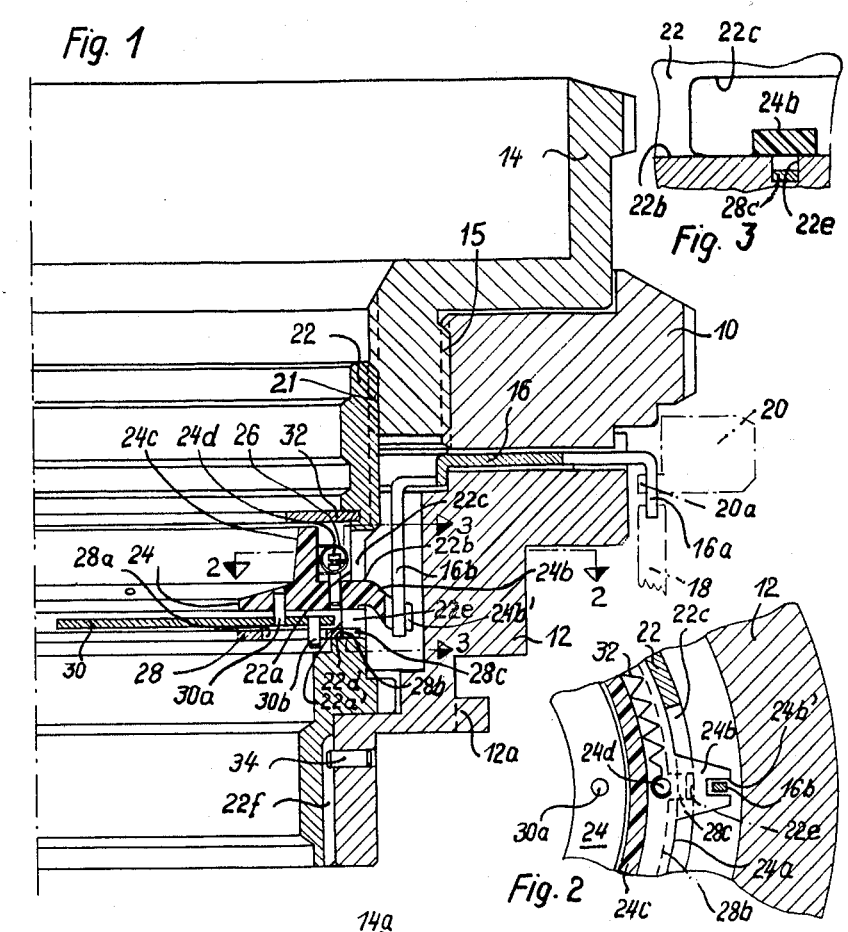
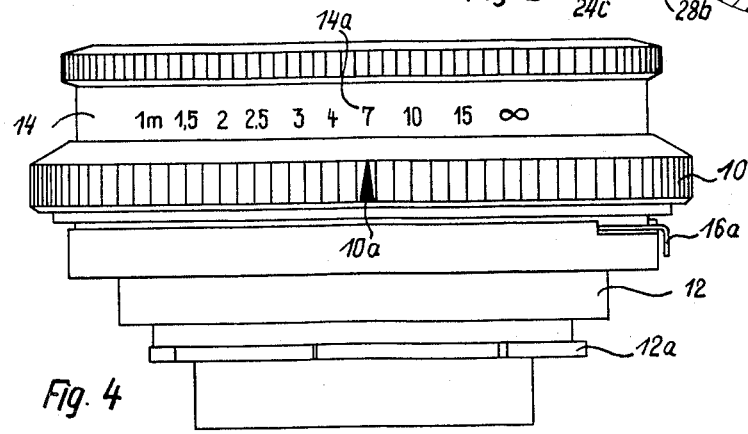

United States Patent Office 3,250,201
Patented May 10, 1966

3,250,201
DIAPHRAGM FOR PHOTOGRAPHIC AND
OTHER PURPOSES
Franz Singer, Munich, Germany, assignor to Compur-Werk Gesellschaft mit beschrankter Haftung & Co., Munich, Germany, a firm of Germany
Filed Aug. 19, 1963, Ser. No. 302,906
Claims priority, application Germany, Sept. 11, 1962, C 27,913
10 Claims. (Cl. 95—64)

This invention relates to a diaphragm, intended particularly for use with a photographic camera, but useful also in other situations where light-controlling diaphragms are needed, as for example in photographic enlargers, and in various kinds of optical instruments and apparatus.

An object of the invention is the provision of a generally improved and more satisfactory diaphragm.

A further object is the provision of a diaphragm which can be easily and economically fabricated and assembled, and which is sufficiently compact to enable it to be used where space is at a premium, as for example in miniature cameras.

Still another object is the provision of a construction which has extremely low friction in operation to adjust the size of the diaphragm aperture, without the need for lubrication, thus resulting in a construction well adapted for use in a camera having so-called "automatic" diaphragm control, where the power available to adjust the diaphragm is very slight.

A further object is the provision of improved means for holding or mounting the various rings and other parts of an adjustable diaphragm assembly.

These and other desirable objects may be attained in the manner disclosed as an illustrative embodiment of the invention in the following description and in the accompanying drawings forming a part hereof, in which:

FIG. 1 is an axial section taken radially through an optical unit embodying a construction in accordance with a preferred embodiment of the present invention;

FIG. 2 is a fragmentary transverse section taken approximately on the line 2—2 of FIG. 1;

FIG. 3 is a fragmentary section taken approximately on the line 3—3 of FIG. 1; and FIG. 4 is an edge view or side elevation of an optical unit incorporating the diaphragm construction of the present invention.

As already indicated, the diaphragm construction of the present invention is useful in a variety of locations or environments, but is particularly useful in an optical unit such as a photographic lens or objective assembly of the interchangeable type, adapted to be placed on and removed from a miniature camera. Hence, it is here illustrated in conjunction with such an objective unit, the objective mount comprising a front part 10 and a rear part 12 conventionally connected to each other by screws. Each of these parts is of generally annular shape, having a central aperture constituting the optical aperture through which light passes in the conventional manner, the effective optical size of the aperture being adjustable by the diaphragm of the present invention.

The rear part of the mount has bayonet lugs 12a which mate in the conventional manner with corresponding bayonet lugs at the front of the camera or other piece of optical apparatus to which the mount is to be applied. At the front of the mount there is a rotatable focusing ring 14, rotatable about the optical axis as a center, and having external screw threads which mate with internal screw threads in the part 10 of the mount, as schematically indicated at 15, so that when the focusing ring 14 is rotated, it will travel forwardly or rearwardly in known manner relative to the mount parts 10 and 12. A focusing distance scale 14a graduated circumferentially on the outside of the mount, cooperates with an index mark or pointer 10a on the stationary part 10 of the mount, to show the distance for which it is focused.

The focusing ring 14 also has internal screw threads 21 into which a lens tube 22 is screwed. Preferably the lens tube is held against rotation by suitable means, such as a fixed pin 34 extending radially in the rear part 12 of the mount, projecting into a longitudinal or axial groove 22f formed in the rear part of the lens tube. Thus when the focusing ring 14 is turned, the lens tube 22 will not turn with it but will move axially forwardly or rearwardly for focusing purposes, as a result of the combined action of the external screw threads 15 and internal threads 21 on the focusing ring 14. The lens tube is preferably of one-piece construction, made of suitable metal such as brass or aluminum, and is inserted into the parts 10, 12, and 14 of the mount, which are likewise of metal.

A diaphragm actuating ring 16 is arranged to rotate in a plane between the two parts 10 and 12 of the mount. It has an arm 16a passing radially outwardly through a slot in the mount, and bent backward at its outer end. This bent outer end (see FIG. 4 as well as FIG. 1) is so made that when the interchangeable objective mount is used on a single lens reflex camera, it is drawn by a return spring against an abutment nose 20a of a diaphragm setting ring or pre-selector ring 20 on the camera (such a ring being well known in the art) and it cooperates also with an operating arm 18 on the camera body which moves the diaphragm actuating ring 16 from its pre-set or pre-selected position to the fully open position, at an appropriate time, for focusing. Such a construction including a pre-selector diaphragm aperture ring on the camera and an arm for opening the diaphragm to a larger aperture for focusing, is known in the art and described in a number of patents, one possible form thereof being seen in Gebele Patent 2,985,085, granted May 23, 1961, in which the pre-selector ring is shown at 16 in FIG. 2 of the patent drawings, and the arm for opening the diaphragm for focusing is shown at 60 in the same view. In the conventional manner, the arm 18 of the present construction is moved in a diaphragm opening direction, for example simultaneously with the cocking or tensioning of the shutter and the winding of the film, and then when the shutter is triggered or released to make the exposure, the arm 18 returns to its rest position, allowing the return spring to move the arm 16 back in a diaphragm aperture reducing direction, until it strikes against the pre-selector ring 20 which thus determines the size of the aperture at the instant of the exposure.

In the preferred construction of the present invention, the objective tube or lens tube 22 is formed internally with two radial steps or shoulder projections 22b and 22d, and with two cylindrical guideway portions 22a and 22a'. The first step shoulder 22b is at the lower end (viewed as in FIG. 1) of the cylindrical guide portion 22a. This step is relatively narrow in a radial direction. Then from the inner edge of the step 22b, the second cylindrical portion 22a' extends further downwardly or in an axial direction, to the second radial step 22d. From the inner edge of the second radial step 22d, the inner face of the lens tube extends further axially (or downwardly when viewed as in FIG. 1) to any desired extent and with any desired variations of interior shape, the exact interior shape from this point onwardly being unimportant for present purposes.

These two steps 22b and 22d constitute locating means or holding means for certain parts of the diaphragm mechanism, as further explained below. In addition to the step formation described, the lens tube 22 is also formed with a lateral opening 22c of substantial size both axially and circumferentially, and with a smaller opening or notch 22e formed at the bottom of the larger opening 22c, as seen in FIG. 3.

There is a diaphragm control ring 24 formed of thermoplastic or synthetic material, for example by injection molding from acetal resin. The control ring has a cylindrical peripheral surface 24a which fits reasonably snugly within the cylindrical part 22a of the lens tube, but with sufficient lateral or radial play to insure that the ring may rotate freely within the lens tube and will not bind therein, notwithstanding variations in temperature or humidity. The flat bottom face of the control rings 24 rests upon the step 22b, which holds the ring against axial displacement in a downward direction when viewed as in FIG. 1. Molded integrally as part of the control ring 24, is an arm 24b which extends radially outwardly through the previously mentioned large opening 22c in the side wall of the lens tube. The outer end of the arm 24b has a radial notch 24b' which receives a rearwardly extending arm 16b on the previously mentioned diaphragm actuating ring 16, thereby coupling the rings 16 and 24 for conjoint concentric rotation about the optical axis as a center.

The ring 24 is formed with a cylindrical flange or collar 24c extending axially forwardly (or upwardly, when viewed as in FIG. 1) from the flat or radially extending part of the ring 24, and spaced radially inwardly from the outer edge 24a of the ring, concentrically therewith. A return spring 26 is accommodated in the annular gap between the flange 24c and the surrounding lens tube 22. One end of the spring is anchored to a pin 24d fixed to the ring 24. The spring extends circumferentially about half way around the periphery of the collar 24c, and the opposite end of the spring is anchored to another pin (not shown) fixed to the lens tube 22 in a position offset about 180 degrees from the pin 24d. This return spring 26 urges the rings 16 and 24 in a counterclockwise direction when viewed from the front of the optical assembly, which is the direction tending to reduce the size of the exposure aperture.

The assembly also includes a stationary diaphragm mounting ring 28 seated in the above mentioned second cylindrical part 22a' of the lens tube, against the second step or shoulder 22d thereof. This diaphragm mounting ring 28 has diaphragm actuating slots 28a of the conventional oblique kind for controlling the leaves of an iris diaphragm. The outer peripheral edge 28b of the ring 28 fits snugly within the cylindrical portion 22a' of the lens tube. The ring also has, at one point on its periphery, a short radially extending arm 28c which extends snugly into the previously mentioned small notch 22e in the lens tube 22, thus securely holding the ring 28 against rotation.

In the axial space between the diaphragm mounting ring 28 and the diaphragm control ring 24, there are any desired number of diaphragm leaves 30, in overlapping relation to each other as customary in an adjustable diaphragm of the iris type. Each leaf 30 has the customary two pins 30a and 30b riveted or otherwise suitably secured to the leaf. The pin 30a extends axially forwardly (upwardly when viewed as in FIG. 1) to make a snug fit into a guide hole in the control ring 24. The pin 30b extends axially rearwardly into the appropriate one of the slots 28a in the ring 28, it being understood that there is one slot 28a for each of the diaphragm leaves 30, in the usual manner. The slots are so shaped, in known manner, that when the control ring 24 is turned in one direction or the other, the diaphragm leaves will be swung to increase or decrease the effective size of the optical aperture, as the case may be.

In addition to the various rings above mentioned, there is also a retaining ring or spring ring 32 arranged just in front of the forward edge of the flange or collar 24c on the ring 24, as seen in FIG. 1. This retaining ring 32 is a split ring which can be contracted diametrically in known manner for purposes of installation, and then will expand so that the outer periphery of the ring seats in an internal annular groove in the lens tube 22, thereby anchoring the diaphragm leaves and the rings 24 and 28 against axial movement. The axial spacing of these various parts is somewhat exaggerated in FIG. 1, for the sake of clarity. Actually, the parts are closer together and make snug sliding fits with each other, with only enough axial play to enable easy rotation of the control ring 24 and easy swinging movement of the various diaphragm leaves 30.

The installation of the diaphragm assembly in the lens tube or objective tube 22 is accomplished before the lenses are mounted in the tube, and preferably before the lens tube is placed within the main body parts 10 and 12 of the mount. The first element placed in the lens tube 22 is the diaphragm mounting ring 28, which is introduced in an inclined position, from the front, until the arm 28c on this ring is properly disposed in the slot 22e of the objective tube. The ring 28 is seated on the seating shoulder or step 22d of the lens tube, centered by snug engagement of the outer periphery or edge 28b of the ring with the cylindrical portion 22a' of the lens tube.

When the ring 28 has been seated, the diaphragm leaves 30 are introduced, and the rearwardly extending pins 30b on the respective leaves are inserted in the respective guide slots 28a of the ring 28. Then the diaphragm control ring 24 is inserted into the lens tube 22, likewise at an inclination or angle, so that the arm 24b will pass through the front opening of the lens tube. The ring 24 is manipulated to cause the arm 24b to extend laterally outwardly through the opening 22c of the lens tube, and is further manipulated (along with any necessary manipulation of the diaphragm leaves 30) to line up the forwardly extending pins 30a on the respective diaphragm leaves with their respective guide holes in the ring 24, so that at the conclusion of the seating of the ring 24 the pins 30a will all extend into their respective holes. Thus the ring 24 is seated on the step or shoulder 22b of the lens tube. The axial spacing of the shoulder 22b from the shoulder 22d is such that when the ring 24 is seated on the shoulder 22b and the ring 28 is seated on the shoulder 22d, there is just sufficient space between the front face of the ring 28 and the rear face of the ring 24, to provide for the diaphragm leaves 30 rather snugly but with sufficient play to permit the desired pivoting adjusting movements of the leaves. The outer peripheral edge 24a of the ring 24 engages reasonably snugly in the cylindrical part 22a of the lens tube 22, but with some radial play to allow for temperature and humidity variations, as explained below.

Then the return spring 26 is mounted in the annular space between the flange 24c of the ring and the cylindrical part 22a of the lens tube, one end of the spring being fastened to the post or pin 24d on the ring, the other end being fastened to the previously mentioned post or pin on the lens tube.

There should be some lateral or radial play between the outer edge 24a of the ring 24 and the cylindrical part 22a of the lens tube, because of differential expansions which may occur between the plastic control ring 24 and the metallic lens tube, as a result of temperature or humidity fluctuations. Enough play must be provided to prevent tight binding or undue friction, under the most adverse conditions of temperature and humidity which are likely to be encountered. It will be noted that the return spring 26, extending approximately half way around the periphery of the flange or collar 24c, has the effect of constantly tending not only to rotate the ring, but also to pull it laterally as a whole, against one side of the cylindrical surface 22a. Thus the portion of the cylindrical surface 22a against which the spring tends to pull the ring 24 constitutes the control surface or locating surface against which the ring 24 is constantly seated in a direction transverse to the optical axis, notwithstanding the radial play which is necessarily provided for the reasons above mentioned. This locating portion of the cylindrical surface 22a is the portion which is approximately diametrically opposite the pin 24d on the ring 24.

After the spring has been installed, the retaining spring ring 32 is then placed in position, contracting the diameter of the ring sufficiently until it will go through the front part of the lens tube and can be expanded to fit into its internal circumferential groove in the lens tube. This spring ring 32 serves as a cover for the previously mentioned parts and at the same time as a safeguard to hold the ring 24, and the parts beneath the ring, against axial forward movement. As previously mentioned, the retaining ring 32 fits snugly against the forward end of the flange 24c on the ring 24, with only enough play to prevent binding under the most adverse conditions of temperature and humidity causing differential expansion or contraction of the respective metal and plastic parts.

After placing of the spring retaining ring 32, the entire lens tube 22, with the assembled diaphragm parts therein, may be inserted in the conventional manner in the main parts 10 and 12 of the mount, taking care to see that the notch 24b' at the end of the arm 24b of the ring 24 is properly engaged with the lug 16b of the diaphragm actuating ring 16. The lenses themselves may be mounted in the tube 22 in the conventional way, either before or after the tube 22 is installed in the main mount 10, 12.

It should be noted that the two rings 24 and 28 are of substantially the same internal diameter, and they project into the light passageway. When the diaphragm leaves are opened to their maximum extent, they lie entirely between the two diaphragm rings 24 and 28. Thus it is the inner edges of the rings 24 and 28 (i.e., the internal diameter thereof) that determine the maximum aperture of the objective.

The present construction affords the advantage that the objective tube or lens tube 22 itself, and the elements of the diaphragm assembly installed in it, are of very simple form and can be very economically manufactured and assembled, or dismantled for repair, through the front opening of the lens tube. A further advantage is that the diaphragm control ring 24 can be made of self-lubricating synthetic or plastic material, as an injection molded part or element, and can be made from plastic materials known per se as low friction materials, impregnated if desired by self-lubricating additives known per se in the plastics art. Thus the coefficient of sliding friction between the ring 24 and the metallic objective tube made, for example, of brass or aluminum, is very small, so that the adjusting of the diaphragm to a different size of aperture can be carried out with a minimum expenditure of effort or power. This is particularly important in the case of a diaphragm to be used with a camera having automatic diaphragm control or regulation, where the power available for operating the diaphragm is ordinarily very slight. The low friction of the present construction enables the invention to be used with such automatic diaphragm controls or regulating devices, without the need for any additional lubrication and without encountering the difficulties which often result from the use of lubricating agents, either liquid or solid.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. An optical unit for use with a photographic camera, comprising an axially stationary mount portion, a diaphragm actuating ring rotatably mounted in said portion, a lens tube mounted within said portion for axial focusing movement with respect to said portion, there being a light passageway extending axially through said tube, and diaphragm mechanism mounted in said lens tube, said mechanism including two diaphragm rings and a plurality of diaphragm leaves mounted between said diaphragm rings and having pin and slot connections with said diaphragm rings so arranged as to adjust the size of an effective optical aperture when one of said diaphragm rings is rotated, characterized by the features that:
   (a) said lens tube has a plurality of cylindrical inner surfaces and stepped projections;
   (b) said two diaphragm rings are held against axial movement in one direction by engagement respectively with said stepped projections and are located in predetermined position in a transverse direction by engagement of the outer edges of the diaphragm rings respectively with said cylindrical surfaces;
   (c) said two diaphragm rings are of substantially equal internal diameter and project into said light passageway and determine the maximum optical aperture;
   (d) a spring retaining ring is mounted in said lens tube in position to hold said two diaphragm rings against axial movement in a direction away from their respective stepped projections;
   (e) one of said diaphragm rings has an arm projecting outwardly through an opening in said lens tube into coupling relationship with said diaphragm actuating ring mounted in said axially stationary mount portion.

2. A construction as defined in claim 1, wherein one of said two diaphragm rings is rotatable with respect to said lens tube and is made of a self-lubricating material.

3. A construction as defined in claim 1, wherein said lens tube is made of metal, and one of said two diaphragm rings is rotatable with respect to said lens tube and is made of thermoplastic synthetic material.

4. An optical unit for use with a photographic camera, comprising an axially stationary mount portion, a diaphragm actuating ring rotatably mounted in said portion, a lens tube mounted within said portion for axial focusing movement with respect to said portion, there being a light passageway extending axially through said tube, and diaphragm mechanism mounted in said lens tube, said mechanism including two diaphragm rings and a plurality of diaphragm leaves mounted between said diaphragm rings and having pin and slot connections with said diaphragm rings so arranged as to adjust the size of an effective optical aperture when one of said diaphragm rings is rotated, characterized by the features that:
   (a) said lens tube has a plurality of cylindrical inner surfaces and stepped projections;
   (b) said two diaphragm rings are held against axial movement in one direction by engagement respectively with said stepped projections and are located in predetermined position in a traverse direction by engagement of the outer edges of the diaphragm rings respectively with said cylindrical surfaces;
   (c) said two diaphragm rings are of substantially equal internal diameter and project into said light passageway and determine the maximum optical aperture;
   (d) one of said diaphragm rings is mounted for rotation and is formed with a cylindrical flange extending axially in a direction away from the other of said diaphragm rings and spaced radially inwardly from the outer edge of such diaphragm ring and from the surrounding portion of said lens tube;
   (e) a return spring extends circumferentially in the space between said flange and said lens tube and is operatively connected to said rotatable one of said diaphragm rings to tend to turn it in one direction;
   (f) a spring retaining ring is mounted in said lens tube in a position to hold said two diaphragm rings against axial movement in a direction away from their respective stepped projections;

(g) one of said diaphragm rings has an arm projecting outwardly through an opening in said lens tube into coupling relationship with said diaphragm actuating ring mounted in said axially stationary mount portion.

5. An optical unit for use with a photographic camera, comprising an axially stationary mount portion, a diaphragm actuating ring rotatably mounted in said portion, a lens tube mounted within said portion for axial focusing movement with respect to said portion, there being a light passageway extending axially through said tube, and diaphragm mechanism mounted in said lens tube, said mechanism including two diaphragm rings and a plurality of diaphragm leaves mounted between said diaphragm rings and having pin and slot connections with said diaphragm rings so arranged as to adjust the size of an effective optical aperture when one of said diaphragm rings is rotated, characterized by the features that:
(a) said lens tube has a plurality of cylindrical inner surfaces and stepped projections;
(b) said two diaphragm rings are held against axial movement in one direction by engagement respectively with said stepped projections and are located in predetermined position in a transverse direction by engagement of the outer edges of the diaphragm rings respectively with said cylindrical surfaces;
(c) said two diaphragm rings are of substantially equal internal diameter and project into said light passageway and determine the maximum optical aperture;
(d) one of said diaphragm rings is mounted for rotation and is formed with a cylindrical flange extending axially in a direction away from the other of said diaphragm rings and spaced radially inwardly from the outer edge of such diaphragm ring and from the surrounding portion of said lens tube;
(e) a return spring extends circumferentially in the space between said flange and said lens tube and is operatively connected to said rotatable one of said diaphragm rings to tend to turn it in one direction;
(f) a spring retaining ring is mounted in said lens tube in a position overlying said rotatable one of said diaphragm rings, thereby to hold such ring against axial movement in a direction away from its respective stepped projection.

6. A construction as defined in claim 5, wherein the rotatable one of said two diaphragm rings is made of self-lubricating material.

7. A construction as defined in claim 5, wherein said lens tube is made of metal, and the rotatable one of said two diaphragm rings is made of thermoplastic synthetic material.

8. A diaphragm and lens tube assembly comprising a lens tube having a central optical axis and two diaphragm rings mounted therein in planes extending transversely to said optical axis and axially spaced from each other, and a plurality of diaphragm leaves mounted between said two rings and operatively connected to them in such manner that rotation of one of said rings relative to the other will change the positions of said leaves to vary the size of the diaphragm aperture, characterized by the features that:
(a) the inner surface of said lens tube is formed with a first cylindrical portion of one diameter, a second cylindrical portion of smaller diameter, a first radial shoulder connecting one end of the first cylindrical portion to an adjacent end of the second cylindrical portion, a second radial shoulder at the opposite end of said second cylindrical portion, and an internal groove extending circumferentially around said first cylindrical portion in axially spaced relation to said first shoulder;
(b) the first of said diaphragm rings is seated on said second shoulder to hold such ring against axial movement in a direction away from said first shoulder and has a peripheral portion engaging said second cylindrical portion to locate such ring in predetermined position transversely of the optical axis;
(c) the second of said diaphragm rings is rotatably seated on said first shoulder to hold such ring against axial movement in a direction toward said second shoulder and has a peripheral portion engaging said first cylindrical portion to locate such ring in predetermined position transversely of the optical axis;
(d) said second diaphragm ring has an upstanding cylindrical flange projecting axially in a direction away from the first diaphragm ring;
(e) a retaining ring has a peripheral edge engaged in and held by said internal groove and overlies said upstanding cylindrical flange in position to hold said second ring against axial movement away from said first radial shoulder on which it is seated.

9. A construction as defined in claim 8, wherein said upstanding cylindrical flange is spaced radially inwardly from and is approximately concentric with said first cylindrical portion of said lens tube, and there is a diaphragm operating spring located in the space between said flange and said first cylindrical portion, said spring being operatively connected to said second ring to tend to rotate such ring.

10. A construction as defined in claim 9, wherein said second ring and said upstanding flange thereon are integrally molded from self-lubricating thermoplastic synthetic material.

References Cited by the Examiner

UNITED STATES PATENTS

| | | | |
|---|---|---|---|
| 2,985,084 | 5/1961 | Gehele | 95—64 X |
| 2,990,761 | 7/1961 | Gehele et al. | 95—64 |
| 3,011,420 | 12/1961 | Sommer | 95—64 |

FOREIGN PATENTS 822,152  10/1959  Great Britain.

NORTON ANSHER, *Primary Examiner.*

C. P. PRICE, *Assistant Examiner.*